Patented Mar. 16, 1937

2,074,127

UNITED STATES PATENT OFFICE 2,074,127

METHOD OF PRODUCING NITROSO-PHENOLS

Wendell W. Moyer, Syracuse, N. Y., assignor to The Solvay Process Company, New York, N. Y., a corporation of New York No Drawing. Application January 3, 1936, Serial No. 57,367

3 Claims. (Cl. 260—69)

This application relates to an improved method for the treatment of phenols to produce nitrosophenols.

In accordance with the present invention it has been found that by the action of nitrosyl chloride upon aqueous phenols or the corresponding phenolates, nitroso compounds may be obtained having the general formula,

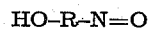

wherein R represents an aryl group, which may contain unreactive substituents; e. g. alkyl or aryl groups, ether groups, etc. Thus para-nitroso-phenol

may be obtained from phenol. The reaction may be carried out at normal or reduced temperature and in the presence or absence of acid binding agents such as ammonia, or an alkali-metal hydroxide or carbonate. The NOCl may be bubbled into a body of aqueous phenol or the three materials water, phenol, and NOCl may be brought into reactive contact in any other suitable manner.

The following specific examples will serve to illustrate the present invention.

*Example 1.*—To a solution of 1 mol. of phenol in 112 mols of water were added 1.2 mols of NOCl at a flow rate of 0.3 mol. per hour. The solution was agitated and its temperature was maintained between 6° and 8° C. during the addition. A yield of the nitroso compound equal to 59% of the theoretical yield, based on the weight of phenol employed, was obtained.

*Example 2.*—The process of Example 1 was repeated with addition of one mol. of ammonia to the solution prior to the introduction of NOCl. The product was isolated and the para-nitroso-phenol thus obtained represented a yield of 60% of theoretical based upon the amount of phenol used.

*Example 3.*—Using the same procedure as in Example 2 and substituting one mol. of NaOH for the one mol. of $NH_3$ a yield of 60% of para-nitroso-phenol was obtained.

By the expression "reactive substituents" employed in the following claims, I mean those substituents which under the conditions of treatment react with nitrosyl chloride.

I claim:

1. The method of preparing a nitroso-phenol compound, which comprises subjecting a phenol free from reactive substituents to the action of NOCl in an aqueous medium.

2. The method of preparing a nitroso-phenol, which comprises introducing NOCl into an aqueous solution of a phenol free from reactive substituents.

3. The method of preparing para-nitroso-phenol, which comprises bringing gaseous NOCl and about an equimolar quantity of phenol in cold aqueous solution into intimate contact.

WENDELL W. MOYER.